US006644191B2

(12) United States Patent
Narui

(10) Patent No.: US 6,644,191 B2
(45) Date of Patent: Nov. 11, 2003

(54) PRINTING MATERIALS ELEVATOR

(75) Inventor: Takao Narui, Inagi (JP)

(73) Assignee: Tokyo Kikai Seisakusho, Ltd. (JP)

( * ) Notice: Subject to any disclaimer, the term of this patent is extended or adjusted under 35 U.S.C. 154(b) by 0 days.

(21) Appl. No.: 09/940,989

(22) Filed: Aug. 28, 2001

(65) Prior Publication Data

US 2002/0029712 A1 Mar. 14, 2002

(30) Foreign Application Priority Data

Sep. 14, 2000 (JP) ....................................... 2000-279504

(51) Int. Cl.[7] .......................... B41L 47/14; B65G 15/00

(52) U.S. Cl. ....................... 101/477; 101/480; 101/219; 414/331.13; 414/331.14; 198/486.1

(58) Field of Search ................................ 101/219, 220, 101/221, 178, 179, 180, 477, 480, 494, 152; 198/408, 410, 486.1, 399, 860.3; 414/331.13, 331.14, 331.04; 221/76, 82, 87

(56) References Cited

U.S. PATENT DOCUMENTS 4,586,434 A * 5/1986 Tokuno et al. .............. 101/178
5,074,212 A * 12/1991 Kobler et al. ............ 101/415.1
5,427,028 A * 6/1995 Nobuta et al. ........... 101/415.1
5,440,985 A * 8/1995 Shimmura et al. .......... 101/477
5,535,898 A 7/1996 Burgess, Sr. et al. ....... 211/206
5,564,336 A * 10/1996 Straubinger et al. ........ 101/152
6,161,480 A * 12/2000 Pfizenmaier ............. 101/463.1
6,209,454 B1 * 4/2001 Christmann et al. ........ 101/152
6,209,704 B1 * 4/2001 Pauling et al. .............. 198/404

FOREIGN PATENT DOCUMENTS

| | | |
|---|---|---|
| DE | 44 42 265 | 5/1996 |
| JP | 61-111296 | 5/1986 |
| JP | 07137223 | 5/1995 |
| JP | 2762029 | 3/1998 |

* cited by examiner

*Primary Examiner*—Leslie J. Evanisko
(74) *Attorney, Agent, or Firm*—McGlew and Tuttle, P.C.

(57) ABSTRACT

Installed in a rotary press which is provided with an upper work floor T and a lower work floor U to accommodate multi-layered printing sections, there are included upper turning bodies B installed at a high level on an upper story W, opposing each other at an interval larger than the width of a press plate P; lower turning bodies C installed at a low level on a lower story X, opposing the upper turning bodies B vertically and opposing each other at the same interval as the upper turning bodies B; endless flexible bodies D looped over the upper and lower turning bodies B and C; a drive unit E for rotating the turning bodies so as to run the endless flexible bodies D all at once; and a press plate holding F unit which has a plurality of press plate holders and which is disposed between the left and right endless flexible bodies D with its left and right sides connected to the rear or front segments of the respective endless flexible bodies D stretched between the upper turning bodies B and the lower turning bodies C.

12 Claims, 6 Drawing Sheets

PRINTING MATERIALS ELEVATOR

FIELD OF THE INVENTION

The present invention relates to a printing materials elevator used in a rotary press which consists of multi-layered printing sections needing press plates and comprises an upper work floor corresponding to the upper printing section and a lower work floor corresponding to the lower printing section, to transfer printing materials such as unused or used press plates and a print roller (roller for the printing sections) between the above described two work floors.

BACKGROUND OF THE INVENTION

Prior art relating to a printing materials elevator which transfers printing materials between an upper work floor and a lower work floor to accommodate multi-layered printing sections of a rotary press is disclosed in Japanese Patent Publication No. 2762029.

The apparatus disclosed in Japanese Patent Publication No. 2762029 is an apparatus for elevating press plates for multi-layered printing sections of a rotary press. It transfers press plates to the upper printing section and transfers used press plates from the upper printing section.

The apparatus is equipped with two endless chains mounted vertically facing each other, and by driving them simultaneously via sprockets, it transfers press plates suspended from press plate hangers mounted between the endless chains.

Incidentally, there is no mention of print roller transfer.

With the prior art described above, i.e., the apparatus disclosed in Japanese Patent Publication No. 2762029, it requires time and labor to take out a desired press plate since press plates are suspended one by one by the endless chains: the operator must start the chain drive to make the chains travel and must stop them at a convenient place to take out the desired press plate. Consequently, it is difficult to improve the efficiency of press plate replacement in the upper printing section.

Besides, to transfer a print roller to the upper printing section, the operator must generally carry the print roller manually from the lower printing section to the upper printing section or raise the print roller by a chain block or electric hoist installed on the upper story. This is burdensome for the operator requiring skill from the operator, and involving risk.

Under these circumstances, there has been demand for a printing materials elevator which allows desired press plates to be transferred without much time and effort and can improve the efficiency of press plate replacement in the above described printing section. Also, there has been demand for a printing materials elevator which allows a print roller to be transferred easily without any risks.

SUMMARY AND OBJECTS OF THE INVENTION

An object of the present invention is to provide a printing materials elevator which allows desired press plates to be transferred without skill, much time and effort and can improve the efficiency of press plate replacement in the upper printing section.

Another object of the present invention is to provide a printing materials elevator which allows a print roller to be transferred easily and can improve the efficiency of print roller replacement in the upper printing section.

Another object of the present invention is to provide a printing materials elevator which allows a print roller to be transferred easily together with desired press plates and can improve the efficiency of press plate and print roller replacement in the upper printing section.

Another object of the present invention is to provide a printing materials elevator which is automatically stopped at a predetermined stopping position.

Another object of the present invention is to provide a safe printing materials elevator which makes it possible to transfer a print roller easily without being concerned about dropping the print roller and reduce the burden on the operator.

Another object of the present invention is to provide press plate holding means which can contain an appropriate number of press plates according to their size.

Another object of the present invention is to provide simply structured endless flexible bodies to which press plate holding means and roller holding means can be easily mounted.

In the embodiment described below, the printing materials elevator A comprises upper turning bodies B, lower turning bodies C, endless flexible bodies D, drive means E, press plate holding means F, and roller holding means G and is configured such that the press plates and print roller in both upper and lower printing sections can be easily replaced.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 5A:
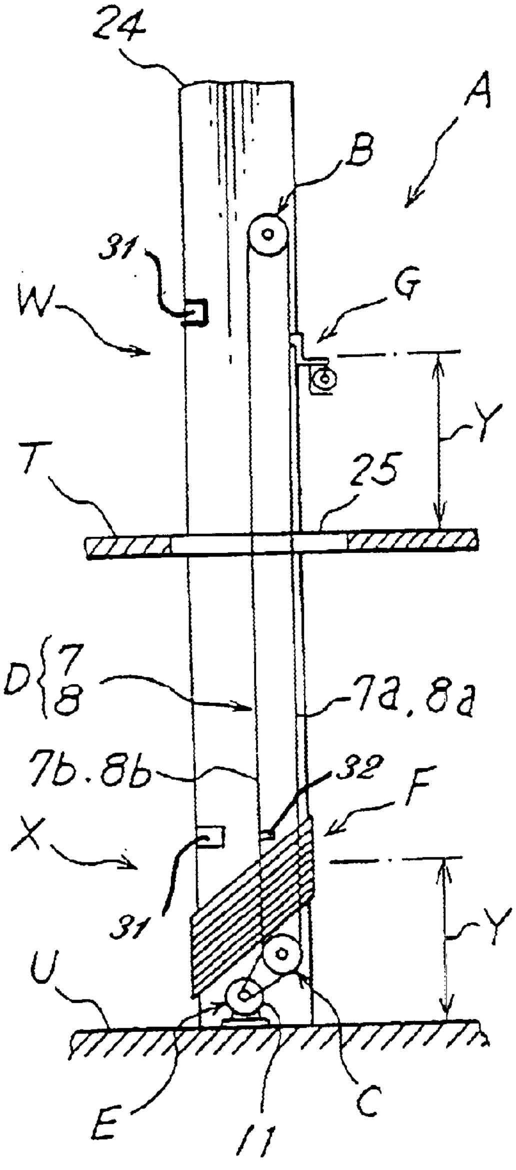
FIGS. 5(*a*)and 5(*b*) are an operational side view showing an operation of the drive means of the printing materials elevator shown in FIG. 1.
Figure 5B:
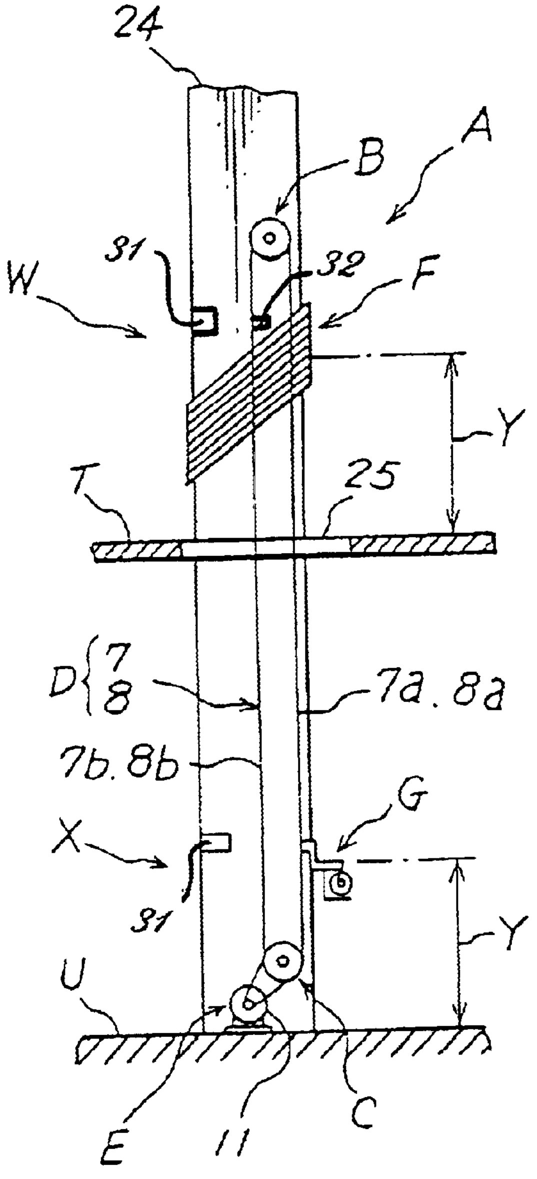
Figure 6:
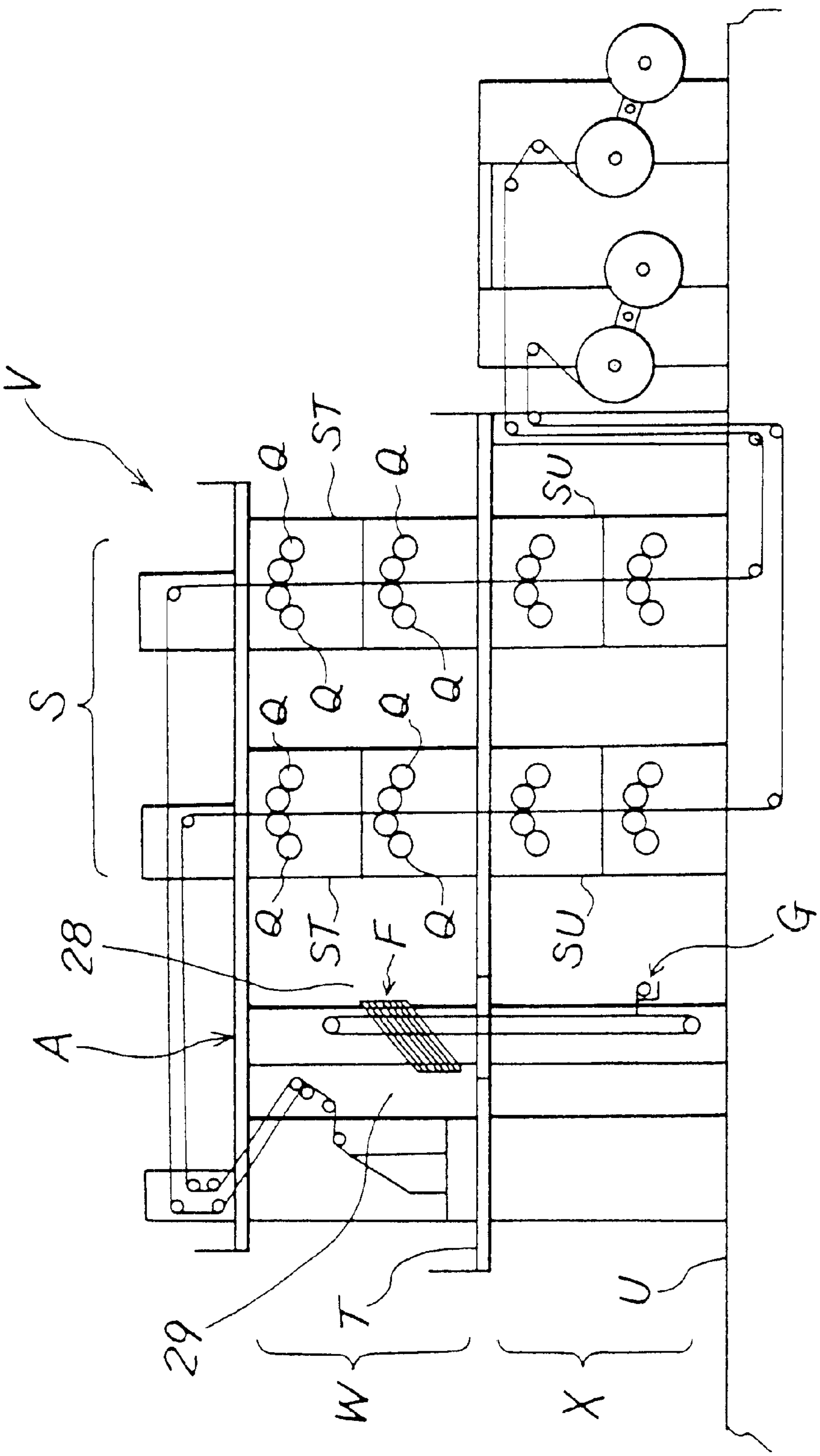
FIG. 6 is a lateral block diagram showing an outline of a rotary press in which the printing materials elevator shown in FIG. 1 is implemented.

Referring to FIGS. 1 to 6, a rotary press V shown in FIG. 6 consists of multi-layered printing sections S (upper printing section ST and lower printing section SU) needing laminated press plates P (see FIGS. 1 and 2), comprises an upper work floor T corresponding to the upper printing section ST and a lower work floor U corresponding to the lower printing section SU, and divides its available space into an upper story W providing a workspace on the upper work floor T and a lower story X providing a workspace on the lower work floor U.

A printing materials elevator A is provided to transfer press plates P and a roller R (see FIG. 4), already used or to be used in the upper printing section ST, between the upper story W and lower story X of the rotary press V.

Figure 1:
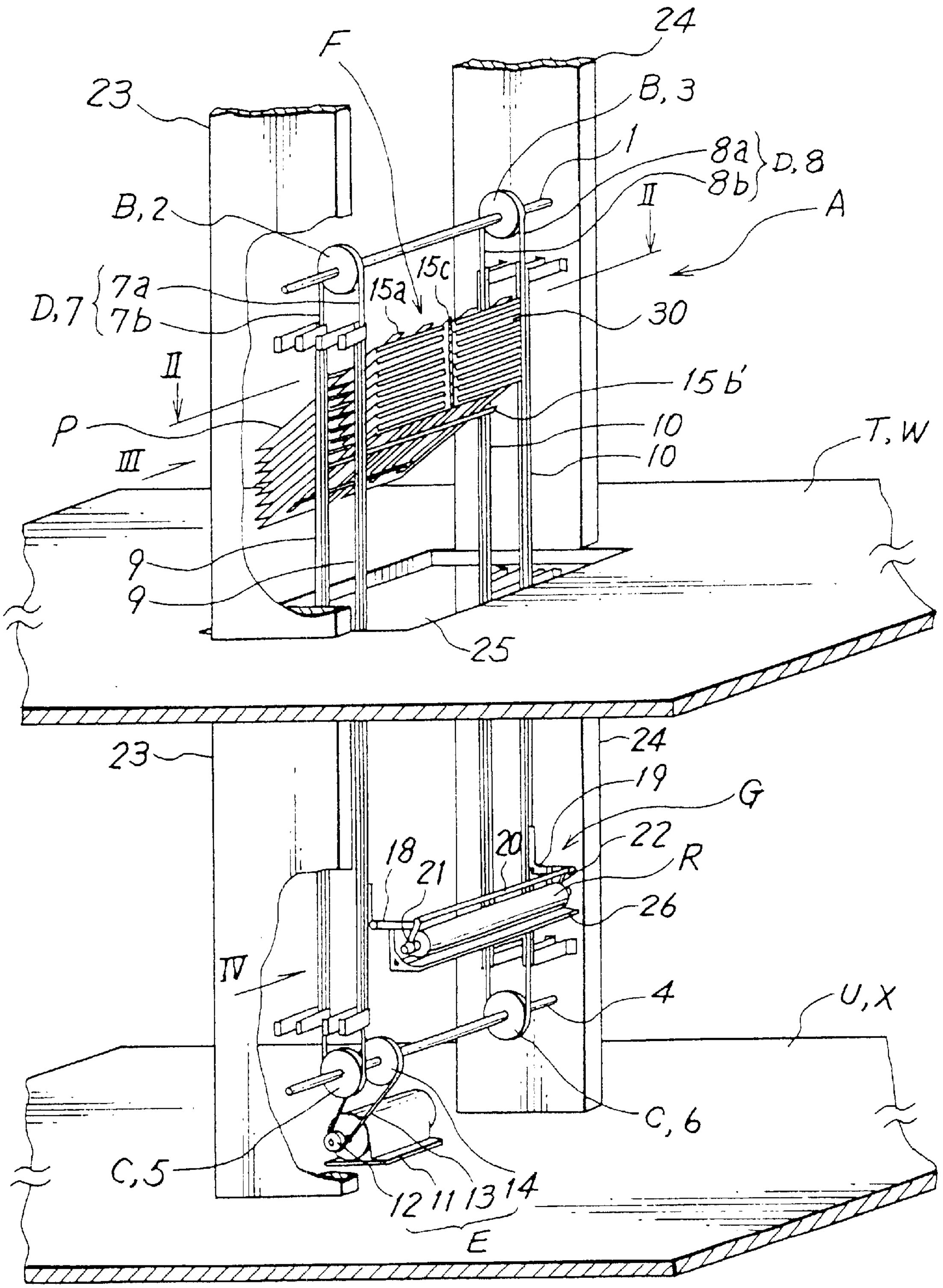
FIG. 1 is a perspective view showing a configuration of an embodiment of the present invention.

The printing materials elevator A of the present invention is installed, for example, between opposed frames 23 and 24 provided on the upper story W and lower story X, passing through the hole 25 made in the upper work floor T of the upper story W, as shown in FIG. 1.

That side of the printing materials elevator A which faces the printing sections S (upper printing section ST and lower printing section SU) constitutes a working side from which the press plates P used on printing cylinders Q in the printing section ST and the print roller R to be replaced are inserted into or taken out of the printing materials elevator A and where the front segments of left and right endless flexible bodies D described later are designed to travel. (Hereinafter, the working side will be referred to as the front side 28 and the other side of printing materials elevator A will be referred to as the rear side 29.)

The printing materials elevator A of the present invention comprises upper turning bodies B, lower turning bodies C, endless flexible bodies D, drive means E, press plate holding means F, and roller holding means G, each of which will be described below.

1. Upper Turning Bodies B

As shown in FIG. 1, a horizontal shaft 1 is rotatably supported between the frames 23 and 24 at a high level (e.g., a level higher than the head of the operator) on the upper story W.

A sprocket 2 and sprocket 3 of an equal outside diameter, which are the left upper turning body and the right upper turning body, respectively, are installed on the shaft 1, opposing each other in the axial direction of the shaft 1, at an interval larger than the width of the press plate P 2. Lower Turning Bodies C As shown in FIG. 1, a shaft 4, parallel to and vertically opposite the shaft 1 of the upper turning bodies B, is rotatably supported between the frames 23 and 24 at a low level (e.g., a level approximately corresponding to the knees of the operator) on the lower story X.

A sprocket 5 and sprocket 6, which are the left lower turning body and the right lower turning body, respectively, and which are equal in outside diameter to and vertically opposite the sprockets 2 and 3 of the upper turning bodies B, are installed in the axial direction of the shaft 4.

3. Endless Flexible Bodies D

Figure 2:
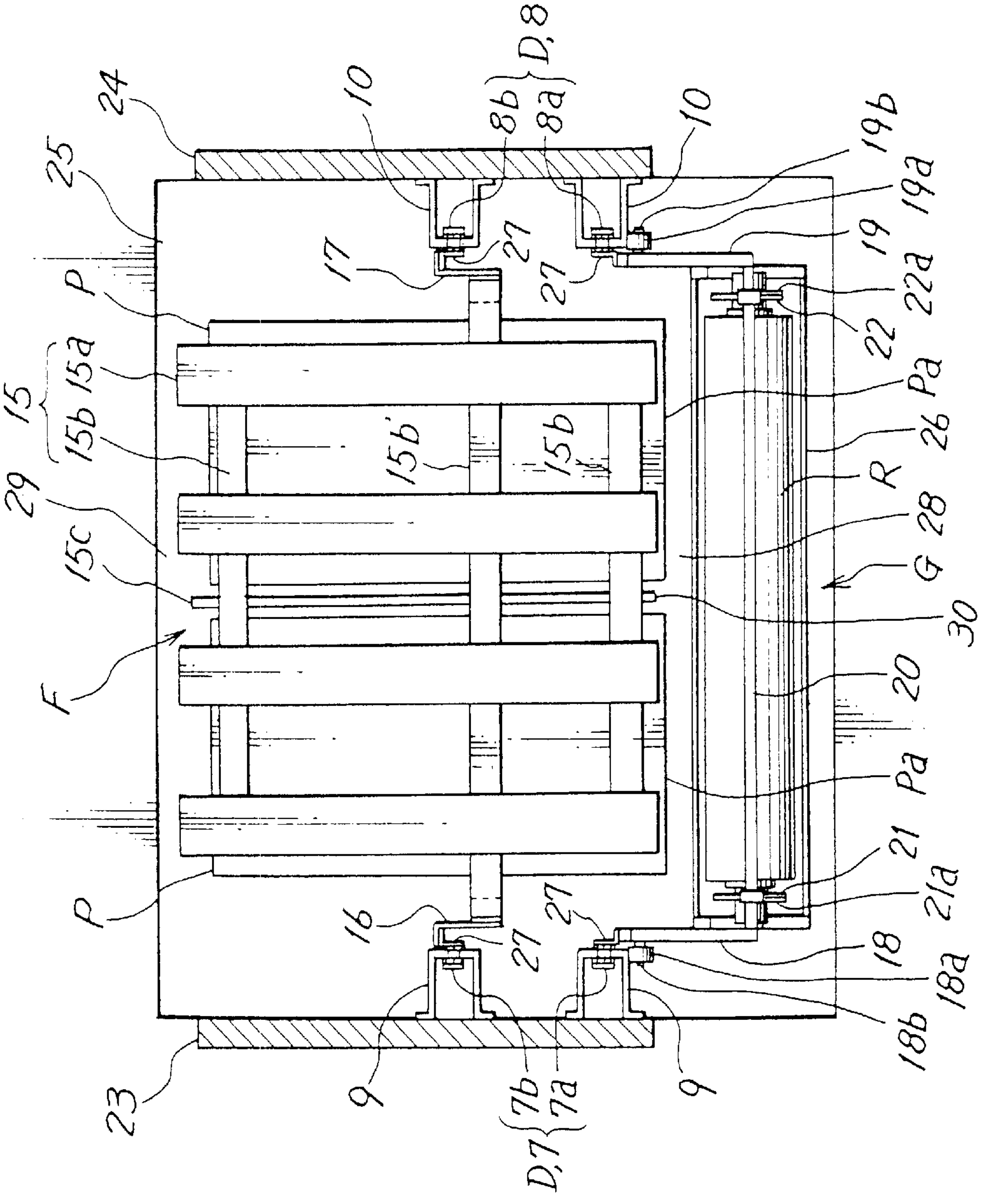
FIG. 2 is a sectional view along a line II—II in FIG. 1 showing a mechanism, including endless flexible bodies, of a printing materials elevator shown in FIG. 1.

These are a left endless flexible body D consisting of a chain 7 and a right endless flexible body D consisting of a chain 8, shown in FIGS. 1 and 2. The chain 7 is looped over the sprocket 2 of the upper turning body B and the sprocket 5 of the lower turning body C. The chain 8 is looped over the sprocket 3 of the upper turning body B and the sprocket 6 of the lower turning body C.

The chains 7 and 8 are roller chains consisting of rollers rotatably attached to the link pins of the chains.

Chain guides 9 and 10 are installed along those segments of the chains 7 and 8 which travel linearly up and down (vertically): specifically, the chain guides 9 are installed along a front chain segment 7*a* and rear chain segment 7*b* of the left endless flexible body and the chain guides 10 are installed along a front chain segment 8*a* and rear chain segment 8*b* of the right endless flexible body.

Each of the chain guides 9 and 10 is a pair of long, narrow plates which sandwich the rollers of the chains 7 or 8 from both sides with small gaps provided.

Legs of the chain guides 9 and 10 are attached to the mutually opposing flanks of the frames 23 and 24.

This restricts the movements of the chain segments 7*a*, 7*b*, 8*a*, and 8*b* except their up-and-down (vertical) movement.

Links 27 with an attachment, which is a link plate extended to form a letter L and protrude like a tongue, are used in the chain segments 7*a*, 7*b*, 8*a*, and 8*b* where press plate holding means F or roller holding means G described later are attached.

4. Drive Means E

As shown in FIG. 1, a motor 11 is installed on the lower work floor U under the lower turning bodies C. The shaft of the motor 11 is fitted with a sprocket 12, whose counterpart, sprocket 14, is fitted over the shaft 4 fitted with the lower turning bodies C. A chain 13 is looped over the sprockets 12 and 14.

The motor 11 starts when a start button on a control panel installed at an appropriate location is pressed. It stops m response to a detection signal from detectors 31 such as proximity switches installed at appropriate locations on the frames 23 and 24 near the chains 7 and 8 of the endless flexible bodies D when the detectors 31 detect detectable elements 32 on the chains 7 and 8 at predetermined stopping locations of the chains 7 and 8. This causes the press plate holding means F or roller holding means G installed on the chains 7 and 8 of the endless flexible bodies D to stop at working height Y (described later) on the upper story W and lower story X so that the chains 7 and 8 travel up and down.

5. Press Plate Holding Means F

Figure 3:
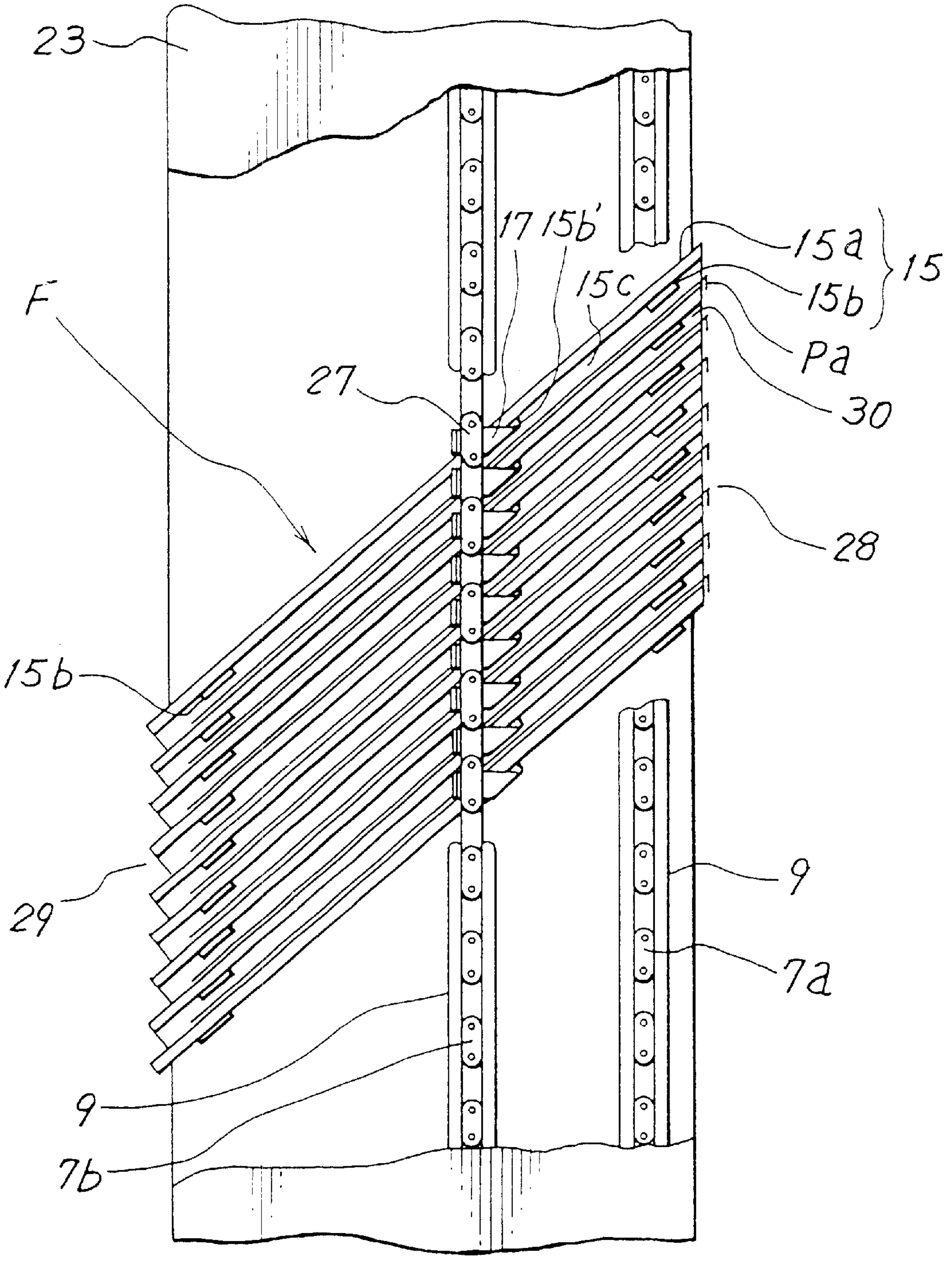
FIG. 3 is a sectional view along a line III—III in FIG. 1 showing press plate holding means of the printing materials elevator shown in FIG. 1.

The press plate holding means F shown in FIGS. 1 and 3 consists of stacked racks 15, which are press plate holders for holding press plates P.

The press plate P is a rectangular sheet, one of whose longer sides is provided with a bent portion Pa formed by folding a narrow bend allowance at an acute angle (see FIG. 3).

As shown in FIG. 2, the rack 15, installed between the frames 23 and 24, consists of long, narrow shelf boards 15*a* arranged at lateral intervals with their length extending from the front side 28 to the rear side 29, long, narrow brackets 15*b* bridged across the underside of the shelf boards 15*a* on the front and rear sides, and a bracket 15*b*' bridged across the underside of the shelf boards 15*a* in the center, forming a lattice.

The bracket 15*b*' bridged across the length of the shelf boards 15*a* in the center has both its ends protruded longer toward the frames 23 and 24 than the brackets 15*b*. Furthermore, both ends are attached to one end each of brackets 16 and 17, whose other ends are connected to the links 27 with the attachment installed on the chain segment 7*b* or 8*b* of the endless flexible body D (see FIGS. 2 and 3).

The racks 15 are connected to the respective links 27 with the attachment, which are mounted consecutively for a certain interval on the chain segments 7*b* and 8*b*.

A connecting plate 15*c* is attached to the center of the underside of the brackets 15*b* and 15*b*', in parallel to the length of the shelf boards 15*a*. The connecting plates 15*c* connect each of the stacked racks 15 with the vertically adjacent rack and partition each rack 15 into right and left halves.

In the front side 28 of the press plate holding means F, the rack 15 has inlets 30 through which press plates P can be taken in and out, and the shelf boards 15*a* of the rack 15 are installed at an angle such that the inlets 30 face obliquely upward. Consequently, the press plate holding means F consisting of the racks 15 has an approximately parallelogram profile on the sides facing the chain 7 or 8, as shown in FIG. 3.

The tilt angle of the shelf boards 15*a* is set approximately equal to the complementary angle of the acute angle of the bent portion Pa of the press plate P.

The racks 15 are supported between the chain segments 7*b* and 8*b* and driven by the drive means E. They are installed such that when the chain 7 and 8 travel, there will be no interference between the press plate holding means F and the edge of the hole 25 made in the above described upper work floor T, between the roller holding means G described below (if attached to the chain segments 7*a* and 8*a*) and the edge of the hole 25 in the upper work floor T, or between the press plate holding means F and roller holding means G.

Although according to the embodiment of the present invention, the press plate holding means F have two columns of inlets 30 with the connecting plates 15*c* installed in the center so that each of the racks 15 will contain two press plates P as shown in FIG. 1, it is possible to change the design and install the connecting plates 15*c* on the right and left sides according to the size of the press plate P so that each of the racks 15 will contain one press plate P.

6. Roller Holding Means G

The roller holding means G shown in FIG. 1 is installed on the chain segments 7*a* and 8*a* of the endless flexible bodies D.

The roller holding means G is installed on the chain segments 7*a* and 8*a*, for example, such that the roller holding means G will be located at the working height Y on the lower story X when the press plate holding means F installed on the chain segments 7*b* and 8*b* stops at the working height (for example, a height between the chest and waist of the operator, i.e., height from the floor convenient for the operator to mount and dismount press plates P and a print roller R to/from the respective holding means F and G) Y on the upper story W and that the roller holding means G will be located at the working height Y on the upper story W when the press plate holding means F stops at the working height Y on the lower story X (see FIGS. 5A and 5B).

Figure 4:
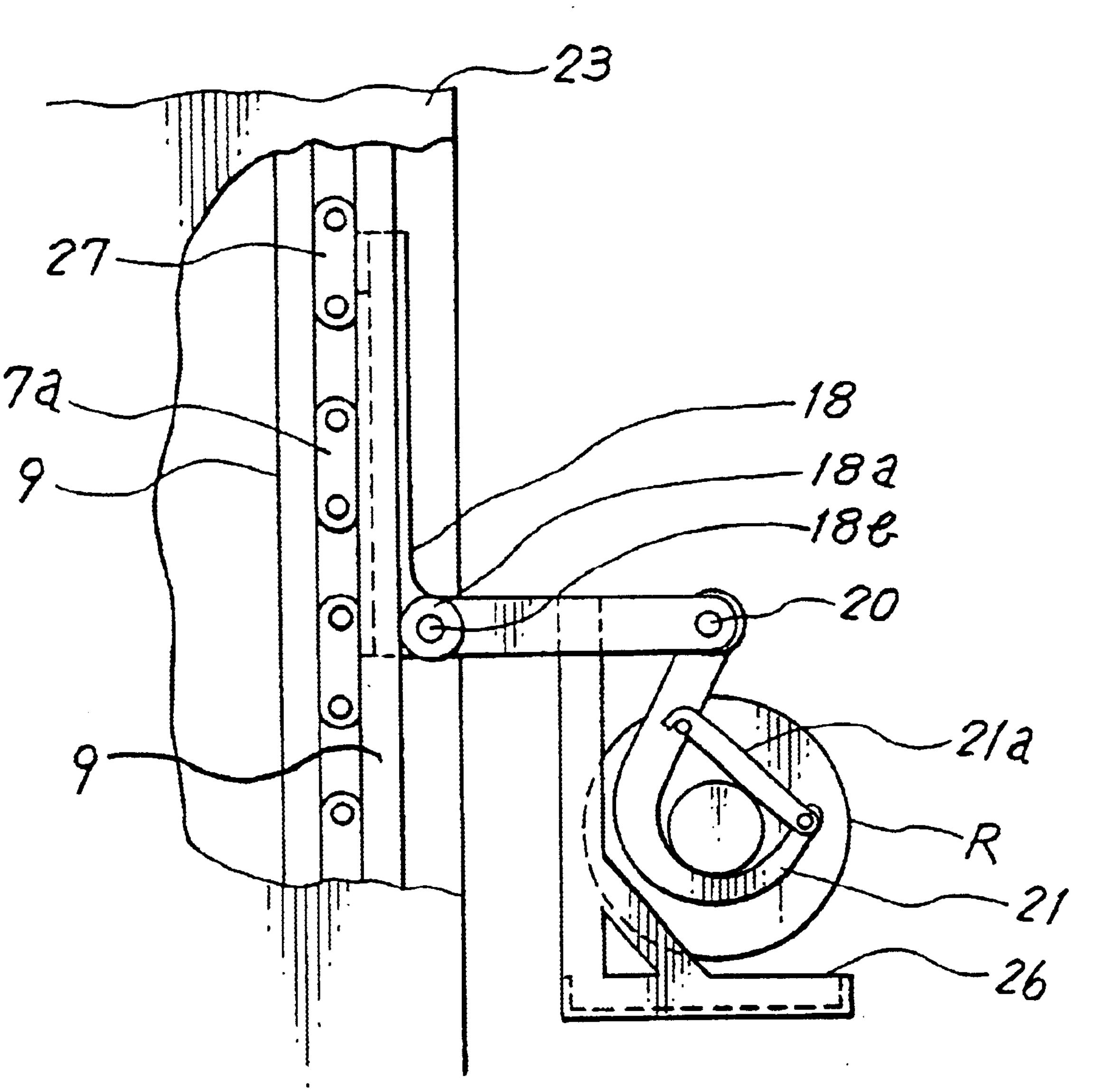
FIG. 4 is a sectional view along a line IV—IV in FIG. 1 showing roller holding means of the printing materials elevator shown in FIG. 1.

The roller holding means G shown in FIGS. 2 and 4 consists of L-shaped arms 18 and 19, one end each of which is connected to the link 27 (equipped with the attachment) installed on the chain segment 7*a* or 8*a* of the endless flexible body D. The lower parts of the L-shaped arms 18 and 19 protrude almost horizontally in the direction opposite to the chain segments 7*b* and 8*b*.

Rollers 18*a* and 19*a* are rotatably supported by respective shafts 18*b* and 19*b* on the flanks of the bent portions of the L-shaped arms 18 and 19. The peripheries of the rollers 18*a* and 19*a* are in contact with the flanks of the chain guides 9 and 10 for the chain segments 7*b* and 8*b*.

The ends of a connecting rod 20 are connected, respectively, to the ends of the protruding portions of the arms 18 and 19 to unite the arms 18 and 19.

Spaced from the arms 18 and 19, respectively, hooks 21 and 22 for holding the print roller R, or roller holders are installed on the connecting rod 20. The bases of the hooks 21 and 22 are rotatably fitted in the connecting rod 20, leaving a space suitable for supporting journals on both ends of the print roller R.

The hooks 21 and 22 are installed in such a way that both flanks of their bases are pinched by collars (not shown) mounted on the connecting rod 20 so that the hooks 21 and 22 will not move in the axial direction of the connecting rod 20.

As shown in FIG. 4, bars 21*a* and 22*a* are mounted on sides of the hooks 21 and 22, serving as stoppers to prevent the journals of the print roller R held by the hooks 21 and 22 from coming off.

A protector 26 is attached to the center of the horizontal protrusion of each arm 18 or 19. The protectors 26, which are shaped like a letter L extending to just under the print roller R supported by the hooks 21 and 22, protect the underside of the print roller R. They are provided with a catch to prevent the print roller R from falling should the journals of the print roller R come off the hooks 21 and 22.

As shown in FIG. 2, the arms 18 and 19 are spaced wider than the rack 15 of the press plate holding means F and the protectors 26 are attached to the arms 18 and 19 at some distance away from the inlets 30 of the press plate holding means F. This prevents interference between the press plate holding means F and roller holding means G as well as between the roller holding means G and the edge of the hole 25 in the upper work floor T when the chains 7 and 8 travel, being driven by the drive means E.

As shown in FIG. 4, the weight of the print roller R held by the hooks 21 and 22 acts on the chain guides 9 and 10 via the rollers 18*a* and 19*a* mounted on the arms 18 and 19 with the ends of the arms 18 and 19 connected to the links 27 (equipped with the attachment) serving as fulcrums. Since the rollers 18*a* and 19*a* travel in rolling contact with the chain guides 9 and 10, the print roller R can be held and transferred in a stable manner during vertical travel of the chain segments 7*a* and 8*a*.

Now the operation of the printing materials elevator A will be described with reference to FIGS. 5A and 5B.

Referring to FIG. 5A, the press plate holding means F and roller holding means G are at halt in a stand-by state, at the working height Y on the lower story X and upper story W, respectively. The press plate holding means F is holding, for example, the press plates P to be used in the upper printing section ST on the upper story W while the roller holding means G is holding, for example, the used print roller R replaced in the upper printing section ST on the upper story W.

In this state, the operator starts the drive means E by pressing a start button on a control panel installed at an appropriate location.

Then the shaft of the motor 11 shown in FIG. 5A rotates clockwise, causing the chains 7 and 8 or the endless flexible bodies D to travel, which in turn causes the press plate holding means F on the lower story X to move up and the roller holding means G on the upper story W to move down.

Referring to FIG. 5B, when the ascending press plate holding means F reaches the working height Y on the upper story W and the descending roller holding means G reaches the working height Y on the lower story X, the detectors detect the detectable elements on the chains 7 and 8 and the motor 11 of the drive means E stops rotation in response to the detection signal, putting the apparatus in the stand-by state. The roller holding means G serves also as to the detectable element.

Consequently, the press plates P to be used in the upper printing section ST is transferred to the upper story W and the used print roller R replaced in the upper printing section ST on the upper story W is transferred to the lower story X.

The sequence of operations described above transfers the press plates P and print roller R in the printing materials elevator A of a rotary press in which the printing sections S (upper printing section ST and lower printing section SU) are installed in two tiers and which has the upper work floor T corresponding to the upper printing section ST and the lower work floor U corresponding to the lower printing section SU.

Although the printing materials elevator A described above comprises both press plate holding means F and roller holding means G, it is also possible to configure the printing materials elevator A to have only press plate holding means F or roller holding means G.

As described above, according to the present invention, since press plates are held in stacks, required press plates can be transferred all at once without much time and effort. Furthermore, since press plates are held by the press plate holding means at a slant and taken in and out of the press plate holding means along the slant, the operator can handle press plates easily and reliably without any need, for example, to support any sag in the middle of the press plates, which is the case when taking them horizontally in and out of press plate holding means. This improves the efficiency of work and eventually the efficiency of press plate replacement.

Also, since the print roller is transferred, being held horizontally in a stable manner, the operator can transfer it easily without being concerned about dropping it. This reduces the operator's burden as well as danger.

While specific embodiments of the invention have been shown and described in detail to illustrate the application of the principles of the invention, it will be understood that the invention may be embodied otherwise without departing from such principles.

What is claimed is:

1. A printing materials elevator used in a rotary press which consists of multi-layered printing sections and which has an upper work floor corresponding to an upper printing section for raising and lowering printing materials as well as a lower work floor corresponding to a lower printing section, comprising:

- a left upper turning body and a right upper turning body installed at a high level on an upper story containing the upper work floor, opposing each other at an interval larger than the width of the printing materials;
- a left lower turning body and a right lower turning body installed at a low level on a lower story containing the lower work floor, opposing the upper turning bodies vertically and opposing each other at the same interval as the upper turning bodies;
- a left endless flexible body having rear and front segments looped over the left upper and lower turning bodies and a right endless flexible body having rear and front segments looped over the right upper and lower turning bodies, said endless flexible bodies being roller chains including rollers rotatably attached to link pins of said roller chains;
- chain guides installed along said front chain segment and said rear chain segment of said endless flexible bodies, each of said chain guides including a pair of long, narrow plates which sandwich said rollers of said roller chains from both sides with small gaps;
- drive means for rotating the turning bodies so as to run the left and right endless flexible bodies all at once; and
- press plate holding means which has a plurality of press plate holders installed at an angle and at predetermined vertical intervals and which is disposed between the left and right endless flexible bodies with left and right sides of the press plate holding means being connected to the rear or front segments of the respective endless flexible bodies stretched between the upper and lower turning bodies, each of said plate holders including stacked racks each having slanted shelf boards, and are configured to contain an appropriate number of press plates according to the size of the press plates.

2. A printing materials elevator according to claim 1, wherein said press plate holding means are attached to links which compose the chains and each of which is equipped with an attachment extending to form a letter L.

3. The printing materials elevator according to claim 1, wherein detectable elements are attached to said endless flexible bodies and when detectors detect said detectable elements, said drive means stops the endless flexible bodies at a predetermined position to stop the press plate holding means in place.

4. A printing materials elevator for raising and lowering printing materials and used in a rotary press which consists of multi-layered printing sections and which has an upper work floor corresponding to an upper printing section and a lower work floor corresponding to a lower printing section, comprising:

- a left upper turning body and a right upper turning body installed at a high level on an upper story containing the upper work floor, opposing each other at an interval larger than the width of the printing materials;
- a left lower turning body and a right lower turning body installed at a low level on a lower story containing the lower work floor, opposing the upper turning bodies vertically and opposing each other at the same interval as the upper turning bodies;
- a left endless flexible body having rear and front segments looped over the left upper and lower turning bodies and a right endless flexible body having rear and front segments looped over the right upper and lower turning bodies;
- drive means for rotating the turning bodies so as to run the left and right endless flexible bodies all at once; and
- press plate holding means which has a plurality of press plate holders installed at an angle and at predetermined vertical intervals and which is disposed between the left and right endless flexible bodies with a left side of the press plate holding means being connected to the rear segment of the left endless flexible body stretched between the upper and lower turning bodies and a right side of the press plate holding means being connected to the rear segment of the right endless flexible body stretched between the upper and lower turning bodies;
- roller holding means wherein roller holders which can hold a print roller outside the travel area of the press plate holding means are connected to the front segments of the left and right endless flexible bodies.

5. The printing materials elevator according to claim 4, wherein each of said plate holders constitutes stacked racks each having slanted shelf boards, and are configured to contain an appropriate number of press plates according to the size of the press plates.

6. The printing materials elevator according to claim 4, wherein said endless flexible bodies are chains and said press plate holding means are attached to links which compose the chains and each of which is equipped with an attachment extending to form a letter L.

7. The printing materials elevator according to claim 4, wherein said endless flexible bodies are chains and said print roller holding means are attached to links which compose the chains and each of which is equipped with an attachment extending to form a letter L.

8. The printing materials elevator according to claim 4, wherein said print roller holding means is provided with a safety catcher to prevent the print roller from falling out of the print roller holding means.

9. The printing materials elevator according to claim 4, wherein detectable elements are attached to said endless flexible bodies and when detectors detect said detectable elements, said drive means stops the endless flexible bodies at a predetermined position to stop the press plate holding means and/or print roller holding means in place.

10. A printing materials elevator used in a rotary press which consists of multi-layered printing sections and which has an upper work floor corresponding to an upper printing section for raising and lowering printing materials as well as a lower work floor corresponding to a lower printing section, comprising:

a left upper turning body and a right upper turning body installed at a high level on an upper story containing the upper work floor, opposing each other at an interval larger than the width of the printing materials;

a left lower turning body and a right lower turning body installed at a low level on a lower story containing the lower work floor, opposing the upper turning bodies vertically and opposing each other at the same interval as the upper turning bodies;

a left endless flexible body having rear and front segments looped over the left upper and lower turning bodies and a right endless flexible body having rear and front segments looped over the right upper and lower turning bodies;

drive means for rotating the turning bodies so as to run the left and right endless flexible bodies all at once; and press plate holding means which has a plurality of press plate holders installed at an angle and at predetermined vertical intervals and which is disposed between the left and right endless flexible bodies with left and right sides of the press plate holding means being connected to the rear or front segments of the respective endless flexible bodies stretched between the upper and lower turning bodies, each of said plate holders includes stacked racks each having slanted shelf boards, and are configured to include an appropriate number of press plates according to a size of the press plates.

11. A printing materials elevator used in a rotary press which consists of multi-layered printing sections and which has an upper work floor corresponding to an upper printing section for raising and lowering printing materials as well as a lower work floor corresponding to a lower printing section, comprising:

a left upper turning body and a right upper turning body installed at a high level on an upper story containing the upper work floor, opposing each other at an interval larger than the width of the printing materials;

a left lower turning body and a right lower turning body installed at a low level on a lower story containing the lower work floor, opposing the upper turning bodies vertically and opposing each other at the same interval as the upper turning bodies;

a left endless flexible body having rear and front segments looped over the left upper and lower turning bodies and a right endless flexible body having rear and front segments looped over the right upper and lower turning bodies, said endless flexible bodies are chains;

drive means for rotating the turning bodies so as to run the left and right endless flexible bodies all at once; and press plate holding means which has a plurality of press plate holders installed at an angle and at predetermined vertical intervals and which is disposed between the left and right endless flexible bodies with left and right sides of the press plate holding means being connected to the rear or front segments of the respective endless flexible bodies stretched between the upper and lower turning bodies, and said press plate holding means being attached to links which compose the chains and each of which is equipped with an attachment extending to form a letter L.

12. A printing materials elevator used in a rotary press which consists of multi-layered printing sections and which has an upper work floor corresponding to an upper printing section for raising and lowering printing materials as well as a lower work floor corresponding to a lower printing section, comprising:

a left upper turning body and a right upper turning body installed at a high level on an upper story containing the upper work floor, opposing each other at an interval larger than the width of the printing materials;

a left lower turning body and a right lower turning body installed at a low level on a lower story containing the lower work floor, opposing the upper turning bodies vertically and opposing each other at the same interval as the upper turning bodies;

a left endless flexible body having rear and front segments looped over the left upper and lower turning bodies and a right endless flexible body having rear and front segments looped over the right upper and lower turning bodies, said endless flexible bodies being roller chains including rollers rotatably attached to link pins of said roller chains;

chain guides installed along said front chain segment and said rear chain segment of said endless flexible bodies, each of said chain guides including a pair of long, narrow plates which sandwich said rollers of said roller chains from both sides with small gaps;

drive means for rotating the turning bodies so as to run the left and right endless flexible bodies all at once; and press plate holding means which has a plurality of press plate holders installed at an angle and at predetermined vertical intervals and which is disposed between the left and right endless flexible bodies with left and right sides of the press plate holding means being connected to the rear or front segments of the respective endless flexible bodies stretched between the upper and lower turning bodies, said press plate holding means being attached to links which compose the chains and each of which is equipped with an attachment extending to form a letter L.

* * * * *